United States Patent
Liu et al.

(10) Patent No.: US 10,690,281 B2
(45) Date of Patent: Jun. 23, 2020

(54) PIPELINE ROBOT CAPABLE OF STEERING ACTIVELY

(71) Applicants: Chengdu University of Technology, Chengdu (CN); SOUTHWEST PETROLEUM UNIVERSITY, Chengdu (CN)

(72) Inventors: Qingyou Liu, Chengdu (CN); Haiyan Zhu, Chengdu (CN); Xu Luo, Chengdu (CN); Guorong Wang, Chengdu (CN)

(73) Assignees: CHENGDU UNEVERSITY OF TECHNOLOGY, Chengdu (CN); SOUTHWEST PETROLEUM UNIVERSITY, Chengdu (CN)

( * ) Notice: Subject to any disclaimer, the term of this patent is extended or adjusted under 35 U.S.C. 154(b) by 201 days.

(21) Appl. No.: 16/062,117

(22) PCT Filed: Jul. 18, 2016

(86) PCT No.: PCT/CN2016/090340
§ 371 (c)(1),
(2) Date: Jun. 14, 2018

(87) PCT Pub. No.: WO2018/006438
PCT Pub. Date: Jan. 11, 2018

(65) Prior Publication Data
US 2018/0363828 A1    Dec. 20, 2018

(30) Foreign Application Priority Data

Jul. 7, 2016  (CN) .......................... 2016 1 0529813
Jul. 7, 2016  (CN) .......................... 2016 1 0529993

(51) Int. Cl.
*F16L 55/34* (2006.01)
*F16L 55/32* (2006.01)
(Continued)

(52) U.S. Cl.
CPC ............... *F16L 55/34* (2013.01); *B25J 9/102* (2013.01); *B25J 9/1694* (2013.01); *B25J 18/025* (2013.01); *F16L 55/32* (2013.01); *B25J 11/0085* (2013.01)

(58) Field of Classification Search
CPC .. F16L 55/32; F16L 55/34; B25J 9/102; B25J 9/1694
See application file for complete search history.

(56) References Cited

U.S. PATENT DOCUMENTS 7,624,831 B2 * 12/2009 Orr ....................... E21B 15/045
                                                           173/184
2005/0284233 A1    12/2005 Teraura et al.

FOREIGN PATENT DOCUMENTS

CN    101117138 A    2/2008
CN    102345781 A    2/2012
(Continued)

*Primary Examiner* — Helen C Kwok
(74) *Attorney, Agent, or Firm* — Bayramoglu Law Offices LLC

(57) ABSTRACT

A pipeline robot capable of steering actively comprises at least two driving knuckles and at least one steering knuckle. Every two adjacent driving knuckles are connected by the steering knuckle. A front end cover is fixed on the front end surface of the driving knuckle at the most front end. A sensor is mounted in the center of the front end cover. A rear end cover is fixed on the rear end surface of the driving knuckle at the rearmost end. A universal spherical hinge is arranged in the center of the rear end cover. Each driving knuckle comprises a main frame, driving mechanisms and telescopic mechanisms; the telescopic mechanisms are mounted in the main frame, and capable of causing contraction of the driving mechanisms into the main frame. The steering knuckle can drive the front driving knuckle connected thereto to steer.

8 Claims, 3 Drawing Sheets

(51) Int. Cl.
  *B25J 9/10*   (2006.01)
  *B25J 9/16*   (2006.01)
  *B25J 18/02*  (2006.01)
  *B25J 11/00*  (2006.01)

(56) References Cited

FOREIGN PATENT DOCUMENTS

| | | |
|---|---|---|
| CN | 102506266 A | 6/2012 |
| CN | 203010110 U | 6/2013 |
| CN | 102979988 B | 7/2014 |
| CN | 104500914 A | 4/2015 |
| CN | 104930298 A | 9/2015 |
| CN | 105003791 A | 10/2015 |
| CN | 105020537 A | 11/2015 |
| CN | 105318142 A | 2/2016 |
| CN | 105318141 B | 5/2017 |
| JP | 2004003966 A | 1/2004 |

\* cited by examiner

US 10,690,281 B2

PIPELINE ROBOT CAPABLE OF STEERING ACTIVELY

CROSS REFERENCE TO RELATED APPLICATIONS

This application is the national phase entry of International Application No. PCT/CN2016/090340, filed on Jul. 18, 2016, which is based upon and claims priority to Chinese Patent Application No. 201610529813.9, filed on Jul. 7, 2016, and Chinese Patent Application No. 201610529993.0, filed on Jul. 7, 2016, the entire contents of which are incorporated herein by reference.

TECHNICAL FIELD

The present invention relates to the technical field of pipeline robots, and in particular to a pipeline robot capable of steering actively.

BACKGROUND

Pipelines serving as an important part of the national lifeline engineering are of the major artery of national energy sources, and its safe operation has a major impact on the national economic development. In order to ensure the safety of the pipelines, it is necessary to detect the pipelines after they have been operating for a period of time, so as to find safety hazards in time.

A pipeline robot functions as a main driving device for realizing pipeline detection. The pipeline robot that carries detection equipment crawls along a pipeline to complete the pipeline detection work. With the continuous scale development of oil and gas and water supply pipelines in China, the structure of pipeline networks is becoming more and more complex. In particular, there are a large number of branch pipelines in urban gas and water supply pipeline networks. Therefore, in order to achieve comprehensive detection of the pipeline networks, the pipeline robot must be able to actively and flexibly steer and perform detection according to the set pipeline lines. In the patents 2007100500568 and 2012104818937, a body which adopts an overall design has poor cornering capability and can crawl along a single pipe path with a larger turning radius only. In the patent 2015107317708 in which movement nipples are connected by a universal joint, and in the patent 2015108488450 in which a main support and a drive motor support that are connected flexibly, passive steering along a pipeline is implemented, such that the cornering capability is improved; however, because these connections belong to passive steering connections, it is still possible to crawl only along a single pipe path and active steering within a multi-branch pipeline network cannot be achieved. Through investigation and analysis, it is found that most of the existing pipeline robots are passively steered, such that they fail to actively steer in case of encountering branch pipelines, and thus cannot meet the testing requirements of complex branch pipeline networks.

Therefore, a pipeline robot capable of implementing active steering is designed and invented against the defects of the existing pipeline robot, which has a positive significance for the detection of complex multi-branch pipeline networks.

SUMMARY

An objective of the present invention is to overcome the defects of the prior art and provide a pipeline robot capable of steering actively, which is capable of steering actively and freely and thus meet the detection requirements for a complex branch pipeline network.

The objective of the present invention is implemented by means of the following technical solutions: a pipeline robot capable of steering actively comprises at least two driving knuckles and at least one steering knuckle, wherein every two adjacent driving knuckles are connected by the steering knuckle; a front end cover is fixed on the front end surface of the driving knuckle at the most front end; a sensor for detecting the path distribution conditions of pipelines in a pipeline network is mounted in the center of the front end cover; a rear end cover is fixed on the rear end surface of the driving knuckle at the rearmost end; a universal spherical hinge for connecting other pipeline detection equipment is arranged in the center of the rear end cover; each driving knuckle comprises a main frame, driving mechanisms and telescopic mechanisms, wherein a plurality of driving mechanisms is mounted on the side wall of the main frame at uniform intervals; the telescopic mechanisms are mounted in the main frame, and capable of causing contraction of the driving mechanisms to the main frame; the steering knuckle is capable of driving the front driving knuckle connected thereto to steer. A screw frame is fixed in the main frame in an axial direction of the main frame; the side wall of the main frame is provided with a plurality of concave receiving grooves at uniform intervals; a first bearing pedestal and a second bearing pedestal are symmetrically arranged on both sides of the receiving groove from the top to the bottom in sequence; a connecting plate is arranged on the upper end surface and the lower end surface of the main frame respectively; the driving mechanisms are mounted inside the receiving grooves; the telescopic mechanisms are mounted on the screw frame and are connected with the driving mechanisms in a transmission manner.

Each of the driving mechanisms comprises side plates, a drive motor and a track, wherein the two side plates are arranged face to face; the drive motor is fixed between the two side plates through a motor mounting plate; a first bevel gear is mounted on an output shaft of the drive motor; a drive shaft and a driven shaft which are parallel with each other are further rotatably mounted on two ends of the two side plates; a second bevel gear is fixed on the drive shaft and meshed with the first bevel gear; a driving gear is also fixed on both ends of the drive shaft respectively; a driven gear is fixed on both ends of the driven shaft respectively; a rack inside the track is meshed with the driving gear and the driven gear and is then connected with the driving gear and the driven gear end to end; a guide rail is also arranged inside each of the two side plates; the inside edge of the track is in contact fit with the guide rail.

Each telescopic mechanism comprises a telescopic drive motor, a screw, a threaded shaft sleeve, connecting rods, a first rotating frame and a second rotating frame, wherein the screw is rotatably mounted on the screw frame; the telescopic drive motor is fixedly mounted on the lower part of the screw frame; a first gear is mounted on an output shaft of the telescopic drive motor; a second gear is mounted on the lower end of the screw; the first gear is in meshing transmission with the second gear; the threaded shaft sleeve is connected with the screw through threads in a fit manner; a plurality of connecting rods is hinged on the side wall of the threaded shaft sleeve; the middle part of each connecting rod is sleeved with a strong spring; a first rotating shaft is mounted on the first bearing pedestal through a bearing; one end of the first rotating frame is fixed to the middle part of the first rotating shaft, and the other end of the first rotating frame is hinged to one end of the side plate; a second rotating shaft is mounted on the second bearing pedestal through a bearing; one end of the second rotating shaft is fixed to the middle part of the second rotating shaft, and the other end of the second rotating frame is hinged to the other end of the side plate; the other end of each connecting rod is hinged to the middle part of the first rotating frame.

The steering knuckle comprises an upper housing, a splined shaft sleeve, a steering housing, a lower housing, a mounting plate, a steering mechanism and a planetary gear mechanism. The upper housing is fixedly connected to the connecting plate of the front driving knuckle by a bolt; the splined shaft sleeve is fixed on the upper housing by means of welding; the mounting plate is fixed on the steering housing by means of welding; the steering housing and the lower housing are rotatably connected in a fit manner through a guide groove; the lower housing is fixedly connected to the connecting plate of the rear driving knuckle by a bolt; the steering mechanism comprises a steering motor, a third gear, a fourth gear and the splined shaft, wherein the steering motor is fixed on the motor mounting frame of the mounting plate by a bolt; an output shaft of the steering motor is connected to the third gear through a key slot; the fourth gear is connected to the splined shaft through a key slot; the third gear is meshed with the fourth gear; the splined shaft is fixed on the bearing pedestal of the steering housing through a bearing and is matched with the splined shaft sleeve. The steering mechanism is cable of rotating every two adjacent driving knuckles around an axis of the splined shaft. The planetary gear mechanism comprises a planetary carrier, a ring gear, a rotating motor, a planetary gear, and a sun gear, wherein the planetary carrier is fixed on the lower housing by means of welding; the ring gear is fixed on the mounting plate by a bolt; the rotating motor is fixed on the motor mounting support of the planetary carrier by a bolt; an output shaft of the rotating motor is connected with the sun gear through a key slot; the planetary gear is fixed on a planetary gear support column of the planetary gear carrier and is meshed with the sun gear and the ring gear respectively. The planetary gear mechanism is capable of rotating the steering housing by 360 degrees with respect to the axis of the lower housing, such that the two adjacent driving knuckles are driven to be able to rotate face to face by 360 degrees by means of the steering knuckles. In a process of making a turn, the rotating motor drives the planetary gear mechanism to drive the driving knuckles to rotate around the central axis, and meanwhile, the steering motor drives the driving knuckles to steer to a branch pipeline direction around the axis of the splined shaft.

The present invention has the following advantages:

1. The pipeline robot is capable of steering actively freely by using the steering knuckles, such that the pipeline robot meets the detection requirements for a complex branch pipeline network.

2. The driving mechanism is contracted by using the telescopic mechanisms when the pipeline robot makes a turn, such that a space required for making a turn is reduced, the application range of the pipeline robot is expanded, and meanwhile, the pipeline robot can meet the detection requirements for pipelines with different pipe diameters.

3. A modularized design of the driving knuckles and the steering knuckles is adopted, and a number of the driving knuckles and the steering knuckles can be connected according to actual conditions to increase the carrying capacity of the pipeline robot.

in drawings, sign references represent the following components: 1—sensor; 2—front end cover; 3—driving knuckle; 3-1—main frame; 3-1-1—screw frame; 3-1-2—receiving groove; 3-1-3—first bearing pedestal; 3-1-4—second bearing pedestal; 3-1-5—connecting plate; 3-2—driving mechanism; 3-2-1—side plate; 3-2-2—guide rail; 3-2-3—driving motor; 3-2-4—motor mounting plate; 3-2-5—first bevel gear; 3-2-6—second bevel gear; 3-2-7—driving gear; 3-2-8—track; 3-2-9—drive shaft; 3-2-10—driven shaft; 3-2-11—driven gear; 3-3—telescopic mechanism; 3-3-1—telescopic drive motor; 3-3-2—first gear; 3-3-3—second gear; 3-3-4—screw; 3-3-5—threaded shaft sleeve; 3-3-6—connecting rod; 3-3-7—first steering frame; 3-3-8—first rotating shaft; 3-3-9—second rotating frame; 3-3-10—second rotating shaft; 4—steering knuckle; 4-1—upper housing; 4-2—splined shaft sleeve; 4-3—steering housing; 4-4—steering motor; 4-5—third gear; 4-6—fourth gear; 4-7—splined shaft; 4-8—lower housing; 4-9—planetary carrier; 4-10—gear ring; 4-11—rotating motor; 4-12—planetary gear; 4-13—sun gear; 4-14—mounting plate; 5—rear end cover; 6—universal spherical hinge.

DETAILED DESCRIPTION OF THE EMBODIMENTS

Figure 1:
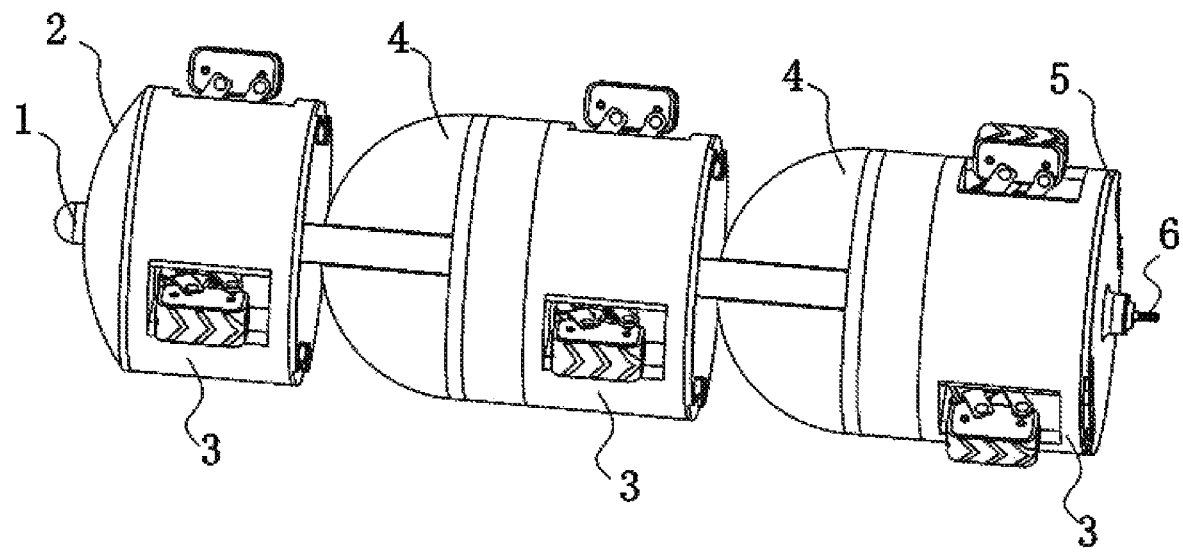
FIG. 1 is a schematic structural diagram of the present invention.
Figure 2:
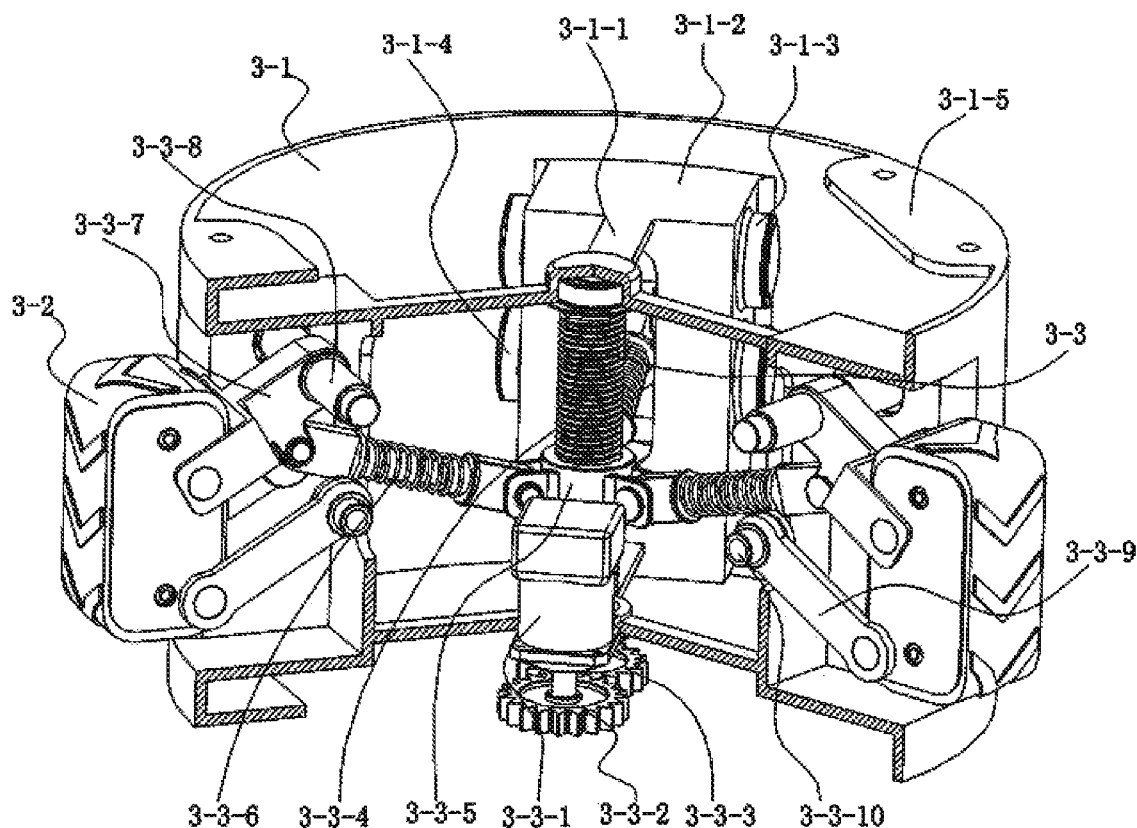
FIG. 2 is a sectional schematic structural diagram of a driving knuckle.

The present invention will be further described with reference to the accompanying drawings, but the scope of protection of the present invention is not limited to the followings. As shown in FIG. 1, a pipeline robot capable of steering actively comprises at least two driving knuckles (3) and at least one steering knuckle (4), wherein every two adjacent driving knuckles (3) are connected by the steering knuckle (4). A front end cover (2) is fixed on the front end surface of the driving knuckle (3) at the most front end. A sensor (1) for detecting the path distribution conditions of pipelines in a pipeline network is mounted in the center of the front end cover (2). A rear end cover (5) is fixed on the rear end surface of the driving knuckle (3) at the rearmost end. A universal spherical hinge (6) for connecting other pipeline detection equipment is arranged in the center of the rear end cover (5). As shown in FIG. 2, each driving knuckle (3) comprises a main frame (3-1), driving mechanisms (3-2) and telescopic mechanisms (3-3), wherein a plurality of driving mechanisms (3-2) is mounted on the side wall of the main frame (3-1) at uniform intervals. The telescopic mechanisms (3-3) are mounted in the main frame (3-1), and capable of causing contraction of the driving mechanisms (3-2) into the main frame (3-1). The steering knuckle (4) is capable of driving the front driving knuckle (3) connected thereto to steer.

As shown in FIG. 2, a screw frame (3-1-1) is fixed in the main frame (3-1) in an axial direction of the main frame (3-1). The side wall of the main frame (3-1) is provided with a plurality of concave receiving grooves (3-1-2) at uniform intervals. A first bearing pedestal (3-1-3) and a second bearing pedestal (3-1-4) are symmetrically arranged on both sides of the receiving groove (3-1-2) from the top to the bottom in sequence. A connecting plate (3-1-5) is arranged on the upper end surface and the lower end surface of the main frame (3-1) respectively. The driving mechanisms (3-2) are mounted inside the receiving grooves (3-1-2). The telescopic mechanisms (3-3) are mounted on the screw frame (3-1-1) and are connected with the driving mechanisms (3-2) in a transmission manner.

Figure 3:
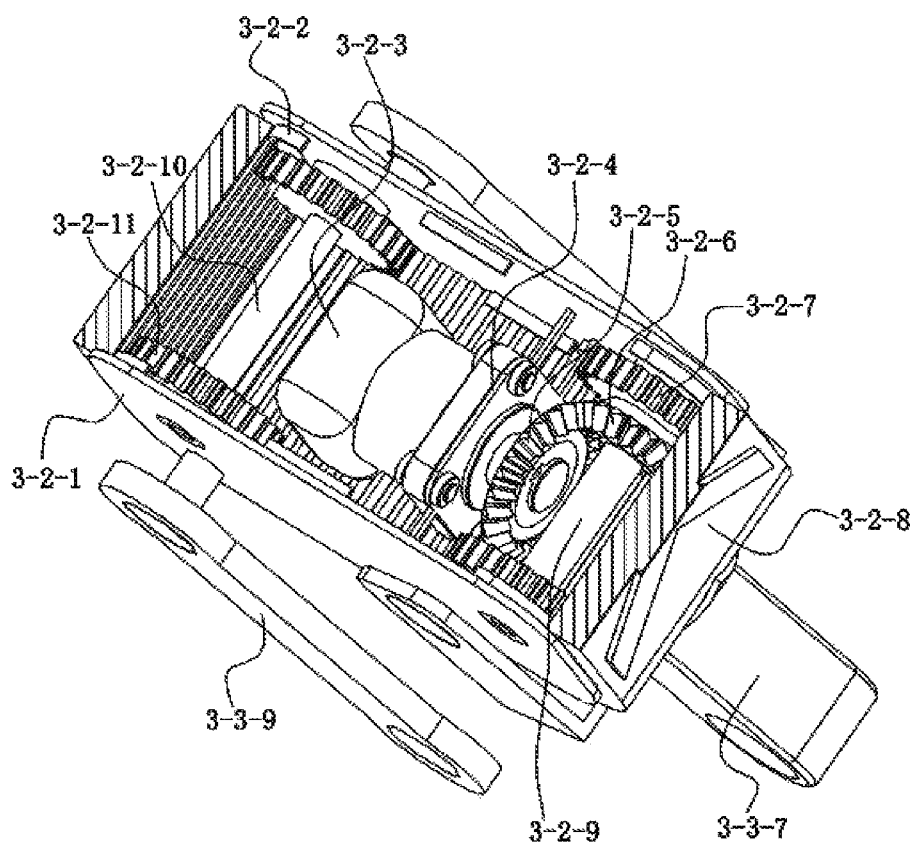
FIG. 3 is a sectional schematic structural diagram of a driving mechanism.

As shown in FIG. 3, each of the driving mechanisms (3-2) comprises side plates (3-2-1), a drive motor (3-2-3) and a track (3-2-8), wherein the two side plates (3-2-1) are arranged face to face. The drive motor (3-2-3) is fixed between the two side plates (3-2-1) through a motor mounting plate (3-2-4). A first bevel gear (3-2-5) is mounted on an output shaft of the drive motor (3-2-3). A drive shaft (3-2-9) and a driven shaft (3-2-10) which are parallel with each other are further rotatably mounted on two ends of the two side plates (3-2-1. A second bevel gear (3-2-6) is fixed on the drive shaft (3-2-9) and meshed with the first bevel gear (3-2-5). A driving gear (3-2-7) is also fixed on both ends of the drive shaft (3-2-9) respectively. A driven gear (3-2-11) is fixed on both ends of the driven shaft (3-2-10) respectively. A rack inside the track (3-2-8) is meshed with the driving gear (3-2-7) and the driven gear (3-2-11) respectively and is then connected with the driving gear (3-2-7) and the driven gear (3-2-11) end to end. A guide rail (3-2-2) is also arranged inside each of the two side plates (3-2-1). The inside edge of the track (3-2-8) is in contact fit with the guide rail (3-2-2). In the working process, the drive motor 3-2-3 drives the first bevel gear 3-2-5 to rotate to drive the driving gear 3-2-7 to rotate, thereby driving the track 3-2-8 to rotate, such that the pipeline robot moves along the pipeline wall.

As shown in FIG. 2, each telescopic mechanism (3-3) comprises a telescopic drive motor (3-3-1), a screw (3-3-4), a threaded shaft sleeve (3-3-5), connecting rods (3-3-6), a first rotating frame (3-3-7) and a second rotating frame (3-3-9), wherein the screw (3-3-4) is rotatably mounted on the screw frame (3-1-1). The telescopic drive motor (3-3-1) is fixedly mounted on the lower part of the screw frame (3-1-1). A first gear (3-3-2) is mounted on an output shaft of the telescopic drive motor (3-3-1). A second gear (3-3-3) is mounted on the lower end of the screw (3-3-4). The first gear (3-3-2) is in meshing transmission with the second gear (3-3-3). The threaded shaft sleeve (3-3-5) is connected with the screw (3-3-4) through threads in a fit manner. A plurality of connecting rods (3-3-6) is hinged on the side wall of the threaded shaft sleeve (3-3-5). The middle part of each connecting rod (3-3-6) is sleeved with a strong spring. A first rotating shaft (3-3-8) is mounted on the first bearing pedestal (3-1-3) through a bearing. One end of the first rotating frame (3-3-7) is fixed to the middle part of the first rotating shaft (3-3-8), and the other end of the first rotating frame (3-3-7) is hinged to one end of the side plate (3-2-1). A second rotating shaft (3-3-10) is mounted on the second bearing pedestal (3-1-4) through a bearing. One end of the second rotating frame (3-3-9) is fixed to the middle part of the second rotating shaft (3-3-10), and the other end of the second rotating frame (3-3-9) is hinged to the other end of the side plate (3-2-1). The other end of each connecting rod (3-3-6) is hinged to the middle part of the first rotating frame (3-3-7). In the process of making a turn, the telescopic drive motor 3-3-1 drives the screw 3-3-4 to rotate through the first gear 3-3-2 and the second gear 3-3-3, such that the threaded shaft sleeve 3-3-5 moves upwards and downwards. The first rotating frame 3-3-7 and the second rotating frame 3-3-9 are driven by the connecting rods 3-3-6 to rotate, such that the driving mechanisms 3-2 extend out of or are contracted to the receiving grooves 3-1-2, and therefore, a space required for making a turn is reduced. In addition, when there is a change in pipe diameter, it is possible to adjust the rotating angles of the first rotating frame 3-3-7 and the second rotating frame 3-3-9 according to the pipe diameter, such that the pipeline robot can meet the detection requirements for pipelines with different pipe diameters.

Figure 4:
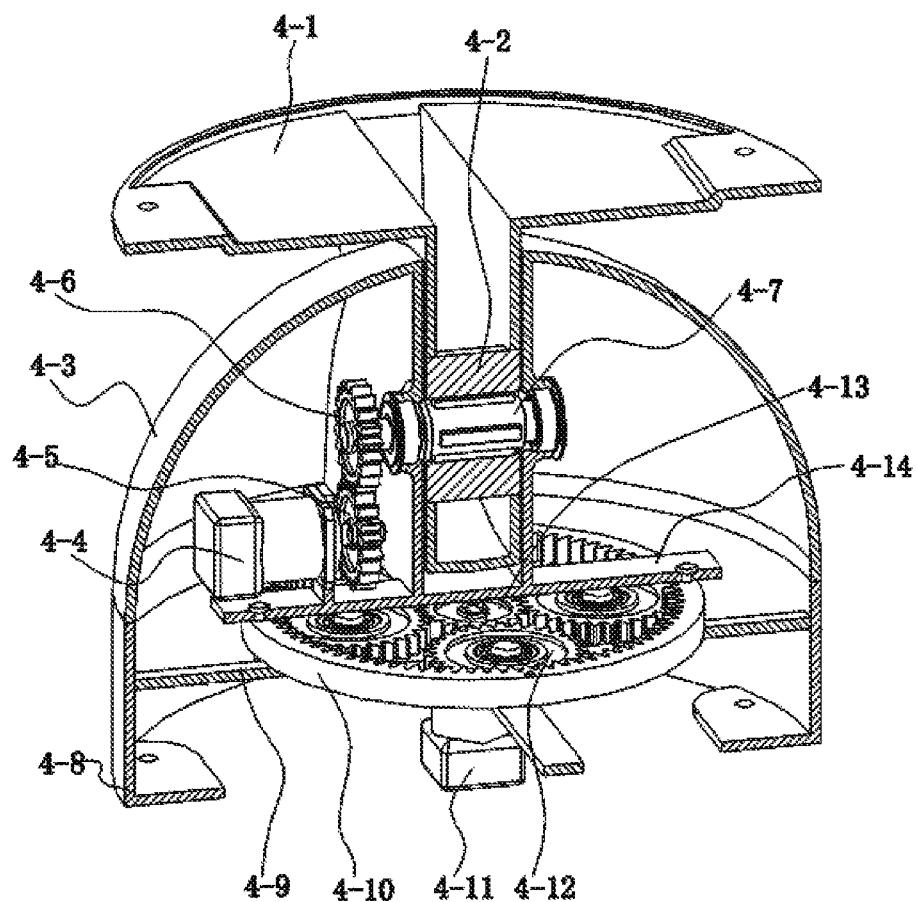
FIG. 4 is a sectional schematic structural diagram of a steering knuckle.

As shown in FIG. 4, the steering knuckle (4) comprises an upper housing (4-1), a splined shaft sleeve (4-2), a steering housing (4-3), a lower housing (4-8), a mounting plate (4-14), a steering mechanism and a planetary gear mechanism. The upper housing (4-1) is fixedly connected to the connecting plate (3-1-5) of the front driving knuckle (3) by a bolt. The splined shaft sleeve (4-2) is fixed on the upper housing (4-1) by means of welding. The mounting plate (4-14) is fixed on the steering housing (4-3) by means of welding. The steering housing (4-3) and the lower housing (4-8) are rotatably connected in a fit manner through a guide groove. The lower housing (4-8) is fixedly connected to the connecting plate (3-1-5) of the rear driving knuckle (3) by a bolt. The steering mechanism comprises a steering motor (4-4), a third gear (4-5), a fourth gear (4-6) and the splined shaft (4-7), wherein the steering motor (4-4) is fixed on the motor mounting frame of the mounting plate (4-14) by a bolt. An output shaft of the steering motor (4-4) is connected to the third gear (4-5) through a key slot. The fourth gear (4-6) is connected to the end part of the splined shaft (4-7) through a key slot. The third gear (4-5) is meshed with the fourth gear (4-6). The splined shaft (4-7) is fixed on the bearing pedestal of the steering housing (4-3) through a bearing and is matched with the splined shaft sleeve (4-2). The steering mechanism is cable of rotating every two adjacent driving knuckles 3 around an axis of the splined shaft 4-7. Preferably, the planetary gear mechanism comprises a planetary carrier (4-9), a ring gear (4-10), a rotating motor (4-11), a planetary gear (4-12), and a sun gear (4-13), wherein the planetary carrier (4-9) is fixed on the lower housing (4-8) by means of welding. The ring gear (4-10) is fixed on the mounting plate (4-14) by a bolt. The rotating motor (4-11) is fixed on the motor mounting support of the planetary carrier (4-9) by a bolt. An output shaft of the rotating motor (4-11) is connected with the sun gear (4-13) through a key slot. The planetary gear (4-12) is fixed on a planetary gear support column of the planetary gear carrier (4-9) and is meshed with the sun gear (4-13) and the ring gear (4-10) respectively. The planetary gear mechanism is capable of rotating the steering housing 4-3 by 360 degrees with respect to the axis of the lower housing 4-8, such that the two adjacent driving knuckles 3 are driven to be able to rotate face to face by 360 degrees by means of the steering knuckles 4. In a process of making a turn, the rotating motor 4-11 drives the planetary gear mechanism to drive the driving knuckles 3 to rotate around the central axis, and meanwhile, the steering motor 4-4 drives the driving knuckles 3 to steer to a branch pipeline direction around the axis of the splined shaft 4-7.

The working process of the pipeline robot capable of steering actively is as follows: in the working process, the sensor 1 detects the path distribution conditions of pipelines in a pipeline network and transmits the information to a control center in real time; in case of encountering a branch pipeline, it is necessary to judge an advancing direction of the pipeline robot, and if the pipeline robot needs to make a turn, the following steps are needed: first, the driving knuckles 3 stop working, and the telescopic mechanism 3-3 of the first driving knuckle 3 of the pipeline robot actuates to cause the driving mechanisms 3-2 to be contracted into the receiving grooves 3-1-2, such that the space required for making a turn is reduced; then, the rotating motor 4-11 of the steering knuckle 4 connected with this driving knuckle 3 drives the planetary gear mechanism to actuate to drive the driving knuckle 3 to rotate around the central axis, such that the driving knuckle 3 is capable of steering to the branch pipeline direction around the axis of the splined shaft 4-7 under the driving the steering motor 4-4; later, the steering motor 4-4 actuates, such that the driving knuckle 3 steers to enter the branch pipeline; when the driving knuckle 3 steers to enter the predetermined branch pipeline, the telescopic mechanism 3-3 actuates, and the driving mechanisms 3-2 extend out, such that the track 3-2-8 is closely attached to the inner wall of the pipeline to drive the robot to advance. The subsequent driving knuckles and steering knuckles repeat the above actions, such that the pipeline robot is gradually and completely transferred into the pipeline to be detected.

The invention claimed is:

1. A pipeline robot configured to steer actively, comprising at least two driving knuckles and at least one steering knuckle, wherein every two adjacent driving knuckles are connected by the steering knuckle; a front end cover is fixed on a front end surface of the driving knuckle at the most front end of the pipeline robot; a sensor for detecting path distribution conditions of pipelines in a pipeline network is mounted in a center of the front end cover; a rear end cover is fixed on a rear end surface of the driving knuckle at a rearmost end of the pipeline robot; a universal spherical hinge for connecting other pipeline detection equipment is arranged in a center of the rear end cover;

each of the at least two driving knuckles comprises a main frame, driving mechanisms and telescopic mechanisms, wherein the driving mechanisms are mounted on a side wall of the main frame at uniform intervals; the telescopic mechanisms are mounted in the main frame, and is configured to cause contraction of the driving mechanisms into the main frame; and the steering knuckle is configured to drive a front driving knuckle connected thereto to steer, wherein a screw frame is fixed in the main frame in an axial direction of the main frame; the side wall of the main frame is provided with a plurality of concave receiving grooves at the uniform intervals; a first bearing pedestal and a second bearing pedestal are symmetrically arranged on a first sides and a second side of a receiving groove from a top to a bottom in sequence; a connecting plate is arranged on an upper end surface and a lower end surface of the main frame respectively; the driving mechanisms are mounted inside the plurality of concave receiving grooves; the telescopic mechanisms are mounted on the screw frame and are connected with the driving mechanisms in a transmission manner.

2. The pipeline robot configured to steer actively according to claim 1, wherein each of the driving mechanisms comprises two side plates, a drive motor and a track, wherein the two side plates are arranged face to face; the drive motor is fixed between the two side plates through a motor mounting plate; a first bevel gear is mounted on an output shaft of the drive motor; a drive shaft and a driven shaft, wherein the drive shaft and the driven shaft are parallel with each other, are further rotatably mounted on two ends of the two side plates; a second bevel gear is fixed on the drive shaft and meshed with the first bevel gear; a driving gear is also fixed on both ends of the drive shaft respectively; a driven gear is fixed on both ends of the driven shaft respectively; a rack inside the track is meshed with the driving gear and the driven gear and is then connected with the driving gear and the driven gear end to end; a guide rail is also arranged inside each of the two side plates; an inside edge of the track is in contact fit with the guide rail.

3. The pipeline robot configured to steer actively according to claim 2, wherein each of the telescopic mechanisms comprises a telescopic drive motor, a screw, a threaded shaft sleeve, a plurality of connecting rods, a first rotating frame and a second rotating frame, wherein the screw is rotatably mounted on the screw frame; the telescopic drive motor is fixedly mounted on a lower part of the screw frame; a first gear is mounted on an output shaft of the telescopic drive motor; a second gear is mounted on a lower end of the screw; the first gear is in meshing transmission with the second gear; the threaded shaft sleeve is connected with the screw through threads in a fit manner; the plurality of connecting rods are hinged on a side wall of the threaded shaft sleeve; a middle part of each of the connecting rods is sleeved with a strong spring; a first rotating shaft is mounted on the first bearing pedestal through a bearing; a first end of the first rotating frame is fixed to the middle part of the first rotating shaft, and a second end of the first rotating frame is hinged to a first end of a side plate; a second rotating shaft is mounted on the second bearing pedestal through a bearing; a first end of the second rotating frame is fixed to a middle part of the second rotating shaft, and a second end of the second rotating frame is hinged to a second end of the side plate; a first end of each of the connecting rods is hinged to a middle part of the first rotating frame.

4. The pipeline robot configured to steer actively according to claim 1 wherein the steering knuckle comprises an upper housing, a splined shaft sleeve, a steering housing, a lower housing, a mounting plate, a steering mechanism and a planetary gear mechanism, wherein the upper housing is fixedly connected to the connecting plate of the front driving knuckle by a bolt; the splined shaft sleeve is fixed on the upper housing by means of welding; the mounting plate is fixed on the steering housing by means of welding; the steering housing and the lower housing are rotatably connected in a fit manner through a guide groove; the lower housing is fixedly connected to the connecting plate of a rear driving knuckle by a bolt; the planetary gear mechanism is configured to drive the front driving knuckle and the rear driving knuckle to rotate around a central axis thereof; the steering mechanism is configured to cause the two adjacent driving knuckles to rotate around an axis of a spindled shaft.

5. The pipeline robot configured to steer actively according to claim 4, wherein the steering mechanism comprises a steering motor, a third gear, a fourth gear and a splined shaft, wherein the steering motor is fixed on a motor mounting frame of the mounting plate by a bolt; an output shaft of the steering motor is connected to the third gear through a first key slot; the fourth gear is connected to an end part of the splined shaft through a second key slot; the third gear is meshed with the fourth gear; the splined shaft is fixed on a bearing pedestal of the steering housing through a bearing and is matched with the splined shaft sleeve.

6. The pipeline robot configured to steer actively according to claim 5, wherein the planetary gear mechanism comprises a planetary carrier, a ring gear, a rotating motor, a planetary gear, and a sun gear, wherein the planetary carrier is fixed on the lower housing by means of welding; the ring gear is fixed on the mounting plate by a bolt; the rotating motor is fixed on a motor mounting support of the planetary carrier by a bolt; an output shaft of the rotating motor is connected with the sun gear through a third key slot; the planetary gear is fixed on a planetary gear support column of a planetary gear carrier and is meshed with the sun gear and the ring gear respectively.

7. The pipeline robot configured to steer actively according to claim 2, wherein the steering knuckle comprises an upper housing, a splined shaft sleeve, a steering housing, a lower housing, a mounting plate, a steering mechanism and a planetary gear mechanism, wherein the upper housing is fixedly connected to the connecting plate of the front driving knuckle by a bolt; the splined shaft sleeve is fixed on the upper housing by means of welding; the mounting plate is fixed on the steering housing by means of welding; the steering housing and the lower housing are rotatably connected in a fit manner through a guide groove; the lower housing is fixedly connected to the connecting plate of a rear driving knuckle by a bolt; the planetary gear mechanism is configured to drive the front driving knuckle and the rear driving knuckle to rotate around a central axis thereof; the steering mechanism is configured to cause the two adjacent driving knuckles to rotate around an axis of a spindled shaft.

8. The pipeline robot configured to steer actively according to claim 3, wherein the steering knuckle comprises an upper housing, a splined shaft sleeve, a steering housing, a lower housing, a mounting plate, a steering mechanism and a planetary gear mechanism, wherein the upper housing is fixedly connected to the connecting plate of the front driving knuckle by a bolt; the splined shaft sleeve is fixed on the upper housing by means of welding; the mounting plate is fixed on the steering housing by means of welding; the steering housing and the lower housing are rotatably connected in a fit manner through a guide groove; the lower housing is fixedly connected to the connecting plate of a rear driving knuckle by a bolt; the planetary gear mechanism is configured to drive the front driving knuckle and the rear driving knuckle to rotate around a central axis thereof; the steering mechanism is configured to cause the two adjacent driving knuckles to rotate around an axis of a spindled shaft.

\* \* \* \* \*